United States Patent [19]

Hagan et al.

[11] 3,996,331
[45] Dec. 7, 1976

[54] PLUTONIUM AND AMERICIUM SEPARATION FROM SALTS

[75] Inventors: Paul G. Hagan, Northglenn; Frend J. Miner, Boulder, both of Colo.

[73] Assignee: The United States of America as represented by the United States Energy Research and Development Administration, Washington, D.C.

[22] Filed: June 24, 1975

[21] Appl. No.: 589,808

[52] U.S. Cl. .................................. 423/18; 423/11; 423/250; 423/251
[51] Int. Cl.² ........................................ C01G 56/00
[58] Field of Search ................ 423/11, 17, 18, 250, 423/251

[56] References Cited

UNITED STATES PATENTS

| 2,577,097 | 12/1951 | Werner ................................ 423/11 |
| 3,743,696 | 7/1973 | Mason et al. ................... 423/250 X |
| 3,781,404 | 12/1973 | Conner et al. ................. 423/250 X |
| 3,804,936 | 4/1974 | Strickland et al. ............ 423/250 X |

*Primary Examiner*—Richard E. Schafer
*Attorney, Agent, or Firm*—Dean E. Carlson; Dudley W. King; Ignacio Resendez

[57] ABSTRACT

Salts or materials containing plutonium and americium are dissolved in hydrochloric acid, heated, and contacted with an alkali metal carbonate solution to precipitate plutonium and americium carbonates which are thereafter readily separable from the solution.

10 Claims, 1 Drawing Figure

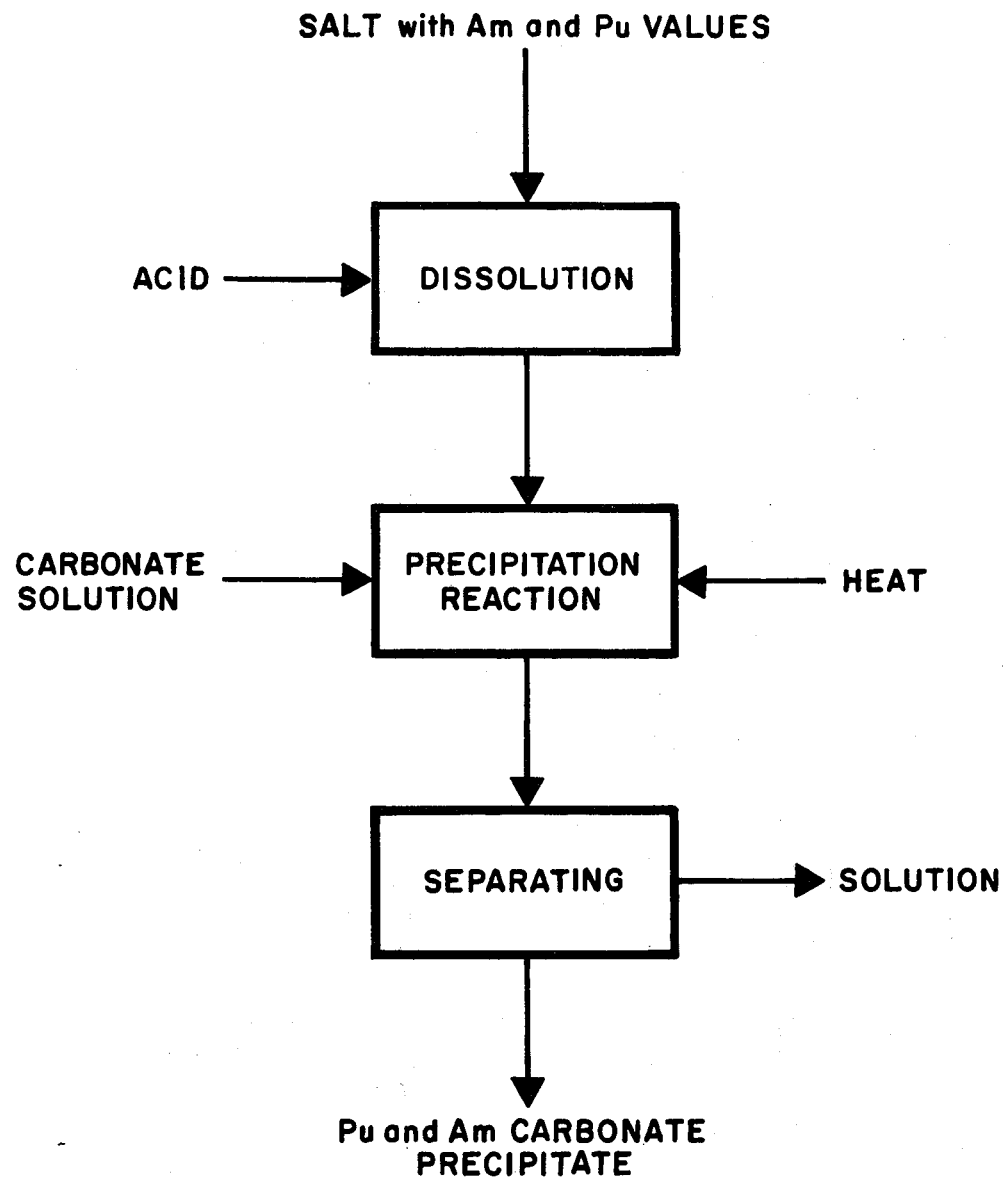

PLUTONIUM AND AMERICIUM SEPARATION FROM SALTS

BACKGROUND OF INVENTION

The invention relates to a process for separating plutonium (Pu) and americium (Am) from materials or salt compositions resulting from molten salt processes.

Various processes are known for treating or separating Pu and Am. For example, U.S. Pat. No. 3,420,639, dated Jan. 7, 1969, describes a method for separating Am from Pu. Further, U.S. Pat. No. 3,460,917, dated Aug. 12, 1969, describes another process for the recovery of Am from Pu metals. In addition, U.S. Pat. No. 3,804,939, dated Apr. 16, 1974, describes a method for precipitating americium oxide from a mixture of Am and Pu metals in a fused salt bath containing plutonium dioxide. As is readily evident, processes for treating Pu and Am are known.

Although these prior art processes successfully accomplish their respective goals, salt used in these processes may become undesirable for further use because of contamination, and/or exhaustion of magnesium ion ($Mg^{++}$) which is consumed as an active metal oxidant. The resultant waste salt contains som Pu and Am "impurities" or values which prohibit or make undesirable disposal of the waste salt. It is desirable to recover and use the Pu and Am values in these waste salts, and a process which would easily and efficiently recover and extract the Pu and Am values from the waste salts would have significance in Pu and Am processing.

SUMMARY OF INVENTION

In view of the above, it is an object of this invention to provide a process for recovering Am and Pu values from salt compositions.

It is a further object of this invention to provide a process for recovering Am and Pu values from salts which have been used as molten salts for Pu metal purification or treatment.

It is a further object of this invention to recover Am and Pu values from acid solutions by precipitating the Am and Pu values as americium carbonate and plutonium carbonate respectively, and subsequently separating this precipitate from the remaining unprecipitated elements.

It is a further object of this invention to provide a process that can recover Am and Pu values from salt compositions, wherein the Am and Pu values are at a concentration as low as $1 \times 10^{-4}$ grams (g) Pu and/or Am per g of salt.

Various other objects and advantages will appear from the following description of the invention and the most novel features will be pointed out hereinafter in connection with the appended claims. It will be understood that various changes in the details, process steps, concentrations or the like of the processes herein described in order to explain the nature of the invention may be made by those skilled in the art without departing from the principles and scope of this invention.

The invention comprises dissolving the Am and Pu values in an acid, thereafter contacting a metal carbonate solution with the dissolved values to effect a reaction and precipitation of americium and plutonium carbonate, and subsequently separating the americium and plutonium carbonate from the solution.

DESCRIPTION OF DRAWING

The drawing illustrates a flow process showing the various steps in the separation of Pu and Am values from a salt composition.

DETAILED DESCRIPTION

This invention may be employed to separate Am and Pu values from a salt composition by the process shown in the drawing wherein the salt containing the Pu and Am values is dissolved in an acid, the resulting solution is heated, and a metal carbonate is added to the solution to effect a reaction between the Pu and Am values with the carbonate and formation of precipitates of plutonium carbonate and americium carbonate. These may thereafter be suitably separated from the solution. While the drawing shows that the metal values of Pu and Am are originally contained in the salt, these metal values could be in other than a salt as long as they are dissolved in an acid or otherwise prepared into an acid solution such that the solution may be heated and a suitable carbonate be added thereto to precipitate the americium carbonate and plutonium carbonate.

The extraction and recovery of Am and Pu values from salt compositions which have been used in molten salt baths and processses for the extraction of Am from Pu as referred to in the Background of Invention, is an appropriate application of this process. The salt composition may be of the type that is normally used in these molten salt processes, and may be varying proportions of sodium chloride (NaCl), potassium chloride (KCl), and magnesium chloride ($MgCl_2$) or various other salt compositions or mixtures thereof which are useful for, or are a product of these molten salt processes in purifying Pu. Examples of typical salt compositions are such as 6 mole % $MgCl_2$, 47 mole % NaCl, and 47 mole % KCl, and also 30 mole % $MgCl_2$, 35 mole % NaCl, and 35 mole % KCl. These salts may be generated such as from the separation of Am from Pu in a process which employs molten salts. The particular salt from which the Pu and Am values are to be extracted and recovered may be such as one which is not useful for further separation in the initial process as a molten salt, because of contamination, and/or exhaustion of $Mg^{++}$, and as such may be termed a "waste" salt, but which may not be desired to be disposed of through conventional means because of the presence of Pu and Am values within the salt. The concentration of Am in such salt solutions may generally be between about 0.5 and about 15 grams per kilogram waste salt and the concentration of the Pu in such salt solutions may generally be from about 10 to about 250 grams per kilogram waste salt. It is understood that these are merely descriptive illustrations and are not to be interpreted as restricting the invention in any way.

The salts are to be dissolved in a suitable acid. If the salt composition is KCl, NaCl and $MgCl_2$, then a suitable acid for dissolution would be hydrochloric acid (HCl). The concentration of the acid is also not a critical element as long as the salts are dissolved. However, since the acid is neutralized by the carbonate solution, it may be preferable not to use too great an excess of acid. In this case, a preferred molarity of HCl may be from about 1 to about 3 molar. Of course it is to be understood that the amount of Pu or Am or salt that is dissolved in the acid is dependent upon the solubility of the salt in said acid. The one to three molar HCl solution may contain from about $1 \times 10^{-4}$ grams to about 90 grams of Pu per liter of solution and from about $1 \times 10^{-4}$ grams to about 5 grams of Am per liter of solution.

The resultant salt solution may be heated prior to the precipitation of the Pu and Am, to a temperature of from about 80° to about 98° C, and preferably between about 88° and about 92° C. While the carbonate ($CO_3^{--}$) precipitation reaction may be effected without heating, heating will provide a more rapid reaction rate and precipitation of the $CO_3^{--}$ reaction product.

The metal carbonate added to the acid solution containing the salt to effect the precipitation reaction is a suitable metal carbonate such as an alkali metal carbonate, for example sodium carbonate ($Na_2CO_3$) or potassium carbonate ($K_2CO_3$). Although the metal carbonate may be added as a solid to the acid solution containing the salt, it is preferably added as a solution wherein the metal carbonate concentrate or solid is dissolved in such as water or other solvent at a suitable concentration, for example, beteen about 0.03 and about 0.12 grams $CO_3^{--}$/milliliter and preferably between about 0.05 and about 0.08 grams of $CO_3^{--}$ per milliliter (ml) of solvent. Contacting of the metal carbonate with the Pu and Am values contained in the salt dissolved in the acid effects a reaction which results in selective precipitation of americium carbonate and plutonium carbonate. The precipitate particles are generally of a size range between about 1 and about 3 micrometers ($\mu$m). Various separation methods may be used to separate the precipitate from the solution, such as decantation, filtration, centrifugation or the like.

Sufficient metal carbonate is added to the solution containing the dissolved salt to precipitate all of the Pu and Am values. If the precipitate is separated by filtration, a washing solution of a suitable liquid such as hot distilled water may be used to wash the precipitate and thereby yield a product of higher purity. The plutonium carbonate and americium carbonate precipitate may be used in the precipitate form or it may be desired to dissolve same into a solution. These precipitates may be dissolved in such as a nitric acid ($HNO_3$) solution, or any suitable acid mixture which would be desirable in subsequent processing of the Pu and Am product.

EXAMPLE I

Plutonium metal was dissolved in HCl to yield a solution containing 10 grams of Pu in 120 ml of 1 normal (N) HCl. The solution was then heated to about 90° C at which time 1 molar (M) $Na_2CO_3$ solution was added slowly to the acid solution until all the Pu had been precipitated from the solution as detected by a rise in pH values as further described hereinbelow. The resultant plutonium carbonate precipitate was filtered and washed with 150 ml of hot distilled water.

EXAMPLE II 40 grams of salt mixtures which comprised 35 mole % NaCl, 35 mole % KCl, and 30 mole % $MgCl_2$ were dissolved in 120 ml of a 1 N HCl solution containing 80 g Pu (III)/liter. Three such prepared salt solutions were heated to 50° C, and 1 molar $Na_2CO_3$ was added to each of these solutions of different rates of addition: 0.5, 2.5 and 5 ml per minute. Another three salt solutions were similarly prepared and heated to 90° C. Again, $Na_2CO_3$ was added to each of the three solutions at different rates: 0.5, 2.5 and 5 ml per minute. In each case, plutonium carbonate precipitates were formed and were subsequently filtered through a 1.5 nanometer filter. The difference noted between the 50° C temperature and a 90° C temperature was that the precipitates formed at 90° C were more easily filtered. In the second series, at 90° C, the precipitates formed at the slower rates of $CO_3^{--}$ addition were more easily filtered.

EXAMPLE III 50 grams of molten salt extraction waste salts, resulting from removal of Am from Pu in which the Am had "grown" with passage of time, and which also contained a small quantity of Pu, were dissolved in 120 ml of 2 N HCl. The acid solution containing the salt was then heated to 90° C and 1 M $Na_2CO_3$ solution was added at a rate of about 2 ml per minute (equivalent to 0.002 moles $CO_3^{--}$ per minute). After the precipitation of the Pu and Am was completed as noted by the rise in pH, the solution was cooled to room temperature of about 27° C and thereafter filtered through a 1.5 nanometer filter. The americium and plutonium carbonate precipitate was then washed twice with 120 ml volumes of hot distilled water per washing. The combined plutonium carbonate and americium carbonate precipitate was filtered and analyzed by infrared spectroscopy, thermogravimetry, and also by X-ray diffraction. The precipitate was then dissoled in 100 ml of a 7.5 N $HNO_3$—0.1 N HF solution. The dissolved precipitate was analyzed spectrophotometrically for Pu valency, for Pu concentration potentiometrically, for Am concentration radiometrically, for sodium, potassium and magnesium by atomic absorption and for chloride ion by specific ion electrode. The filtrate solutions were analyzed for Pu and Am concentration radiometrically.

The results shown in the Table demonstrate the effectiveness of the carbonate precipitation process to remove or extract Am and Pu from molten salt extraction waste salts. Pu and Am were selectively and quantitatively precipitated from solution in the runs of Example 3 as shown in the Table. The precipitates formed were light blue in color, crystalline and easy to filter. The filtration time for each of the precipitates was less than 1 minute. The average density of the precipitate was 2.54 grams of Pu and Am per cubic centimeter of precipitate.

Precipitates from run 1 and run 2 were then separately dissolved in 100 ml of 7 N $HNO_3$—0.1 N HF solution. Analysis of the dissolved precipitate showed an average of 153 grams per liter (g/l) of Pu, 5 g/l of Am, and only 698 milligrams per liter (mg/l) of sodium, 132 mg/l of potassium, and 36 mg/l of magnesium. The average carryover of chloride ion was only 1.4 g/l.

Analysis of the filtrate in run 1 yielded Pu at $9.8 \times 10^{-4}$ g/l and Am at $8.8 \times 10^{-6}$ g/l. Analysis of the run 2 filtrate yielded Pu at only $9.2 \times 10^{-4}$ g/l and Am at $7.0 \times 10^{-6}$ g/l. These results demonstrate the quantitative manner in which Pu and Am are precipitated from the solution.

Analysis of the 400 ml of distilled water which were used to wash the precipitate in run 1 showed only $1.5 \times 10^{-4}$ g/l Pu and less than $4.3 \times 10^{-6}$ g/l Am. Analysis of the wash solution from the second run showed $1.0 \times 10^{-4}$ g/l Pu and again less than $4.3 \times 10^{-6}$ g/l Am. These results show that the carbonate precipitate may be washed with hot water without a detrimental loss of Pu and Am.

It is believed that the Pu compound that is formed, as determined through X-ray diffraction analysis, is $Pu_2(CO_3)(OH)_4 \cdot xH_2O$. The infrared spectrum of the plutonium carbonate compound that is formed indicates covalently-bonded carbonate groups rather than an ionic carbonate species.

Thermogravimetric analysis of the precipitate shows no anomalous characteristics. When the precipitate was heated to 100° C it lost 14.2% of its weight which is attributable to the volatilization of absorbed water. Between 100° and 320° C the precipitate lost an additional 4.5%, and between 320° and 420° C the precipitate lost 8.2% of its weight. During the temperature rises, the weight loss is attributed to the conversion of plutonium carbonate to plutonium oxide.

With the exception of some tetravalent plutonium oxide, the plutonium in molten salt extraction waste salts is in the trivalent state. The carbonate precipitation process was not found to alter this valency. To demonstrate this, a solution of pure trivalent plutonium chloride was scanned spectrophotometrically and then the Pu was precipitated from solution as would be done in the process. After the precipitate was filtered and washed, it was dissolved in 1 M HCl. Analysis revealed that none of the principal peaks of trivalent plutonium were changed and there were no peaks indicating the presence of tetra- or hexavalent Pu.

The molten salt extraction waste salts from which the Pu and Am are to be extracted and recovered dissolve readily in 2 M HCl. The volume of acid used to dissolve the salts may be about 2.4 liters of 2 M HCl per kilogram of molten salt extraction waste salt.

The Pu and Am form carbonate precipitates in the salt solution between pH's of 4.0 and 5.5; therefore, before precipitation can begin the acid solution containing the dissolved salts must first be neutralized. This may be easily accomplished by adding a solution of 2 M $Na_2CO_3$. As the dissolved salt solution approaches a pH of 4 by the addition of $Na_2CO_3$ or other alkali metal carbonate,

TABLE

| Nominal Composition of 50 g of MSE[a] Waste Salt | | Quantity of Element found in Ppt | | Method of Analysis[b] |
|---|---|---|---|---|
| | | Run No. 1 | Run No. 2 | |
| Pu | 16 g | 15.7 g | 15.0 g | PT |
| Am | 0.5 g | 0.4 g | 0.6 g | RC |
| Na | 3.6 g | 78.1 mg | 61.4 mg | AA |
| K | 6.2 g | 15.2 mg | 11.1 mg | AA |
| Mg | 3.2 g | 4.1 mg | 3.0 mg | AA |
| Cl | 21.1 g | 100 mg | 100 mg | SIE |

[a]Molten salt extraction
[b]PT = Potentiometric titration
RC = Radiometric counting
SIE = Specific ion electrode
AA = Atomic absorption the precipitate begins to form.

It would appear that at first a reaction takes place in which the salts are dissolved and then reprecipitated. Since Pu and Am form hydroxide precipitates in this pH range, it is possible that a competition is taking place between the carbonate and hydroxide ions for the Pu and Am. The reaction may be generally slow unless the solution is hot; therefore it may be desirable that the temperature of the acid solution containing the salt during precipitation be between about 80° and about 98° C and preferably about 90° C.

Although the carbonate addition rate may be varied over a wide range, an acceptable and desirable rate of carbonate addition may be between about 0.02 and about 0.06 moles of $CO_3^{--}$ per mole of Pu or Am per minute, and preferably is at about 0.05 moles of $CO_3^{--}$ per mole of Pu or Am per minute. To form the carbonate precipitate, the Pu and Am react with carbonate ions in the ratio of 2 moles Pu or Am to 3 moles of $CO_3^{--}$. Therefore, if 2 kilograms of salt containing 478 grams (2 moles) of Pu and Am is processed, then 318 grams of $Na_2CO_3$ (3 moles) would have to be added for complete precipitation, and it may be desirable to add a slight excess of $Na_2CO_3$. Each step of the plutonium and americium carbonate precipitation process may be followed by pH monitoring. In the initial acid neutralization step, the pH may gradually rise until the Pu and Am begin to precipitate at a pH of about 5. After all the Pu and Am have been precipitated, the pH rapidly changes to about 7.4 at which pH the solution becomes buffered through the reaction of the carbonate with water to form bicarbonate and hydroxyl ions. This buffering action prevents the solution from becoming basic enough to precipitate the magnesium which may be a major constituent of the salt being processed. Magnesium precipitates as a hydroxide in molten salt extraction waste salt solutions at a pH of about 9. It may be desirable not to add an excessive amount of carbonate after the buffer point of 7.4 since magnesium does form an insoluble carbonate compound and plutonium carbonate does solubilize if an appreciable excess of carbonate is added.

The precipitate that is formed is of a crystalline nature having a size range of from about 1 to about 3 $\mu$ m. The color of the precipitate is a light blue.

What is claimed is:

1. A process for separating plutonium and americium from an acid solution comprising hydrochloric acid and containing plutonium and americium comprising contacting said acid solution with an alkali metal carbonate solution comprising sodium carbonate, to effect formation of a plutonium carbonate and an americium carbonate as precipitates, and separating said precipitates from said solution.

2. The process of claim 1 including heating said acid solution to from about 80° to about 98° C prior to and during said contacting of said acid solution with said carbonate solution.

3. The process of claim 1 wherein said acid solution is from about 1 molar to about 3 molar hydrochloric acid solution containing from about 1 × 10$^{-4}$ grams per liter to about 90 grams per liter plutonium and from about 1 × 10$^{-4}$ grams per liter to about 5 grams per liter americium.

4. The process of claim 1 wherein said separating comprises filtering said solution containing said precipitates to filter said precipitates from said solution, and thereafter washing said precipitates with hot distilled water.

5. A process for extracting and recovering plutonium and americium values from salt compositions containing said values and resulting from molten salt plutonium treating processes comprising dissolving said salts in hydrochloric acid to form an acid solution, contacting said acid solution with a metal carbonate solution comprising sodium carbonate, to effect formation of a precipitate of plutonium carbonate and americium carbonate, and separating said precipitate from said acid solution and said carbonate solution.

6. The process of claim 5 including heating said acid solution to from about 80° C to about 98° C prior to and during said contacting with said carbonate solution.

7. The process of claim 5 wherein said carbonate solution comprises an alkali metal carbonate compound dissolved in water at a $CO_3^{--}$ mole concentration of from about 30 grams per liter to about 120 grams per liter.

8. The process of claim 5 wherein said separating comprises filtering said precipitate from said acid solution and said carbonate solution, thereafter washing said precipitate with hot distilled water, and subsequently dissolving said precipitate in a nitric acid solution.

9. The process of claim 5 wherein said salt composition is from about 35 to about 47 mole percent sodium chloride, from about 35 to about 47 mole percent potassium chloride, and from about 6 to about 30 mole percent magnesium chloride.

10. The process of claim 9 wherein said salt composition is about 35 mole percent sodium chloride, about 35 mole percent potassium chloride, and about 30 mole percent magnesium chloride.

* * * * *